(12) United States Patent
McIntyre

(10) Patent No.: US 8,151,731 B2
(45) Date of Patent: Apr. 10, 2012

(54) FEEDER

(75) Inventor: Robert Dymock McIntyre, Hunterville (NZ)

(73) Assignee: Peach Teats Limited, Hunterville (NZ)

( * ) Notice: Subject to any disclaimer, the term of this patent is extended or adjusted under 35 U.S.C. 154(b) by 85 days.

(21) Appl. No.: 12/730,773

(22) Filed: Mar. 24, 2010

(65) Prior Publication Data

US 2010/0313816 A1   Dec. 16, 2010

Related U.S. Application Data

(63) Continuation-in-part of application No. 29/352,071, filed on Dec. 15, 2009.

(51) Int. Cl.
*A01K 9/00* (2006.01)
*A01K 5/00* (2006.01)
*A01K 7/00* (2006.01)

(52) U.S. Cl. ............................................. 119/71; 119/72

(58) Field of Classification Search ................ 119/51.01, 119/51.03, 71, 52.1, 53, 53.5, 54, 61.5, 61.56, 119/64, 65, 72, 72.5, 417, 449, 454, 456, 119/475, 477, 515, 521, 14.01, 14.08, 14.18; *A01K 9/00, 5/00, 7/00*
See application file for complete search history.

(56) References Cited

U.S. PATENT DOCUMENTS

| | | | | |
|---|---|---|---|---|
| 1,385,510 | A * | 7/1921 | Ward | 119/71 |
| 3,703,159 | A * | 11/1972 | Rose-Miller | 119/496 |
| 3,741,163 | A * | 6/1973 | Bush | 119/54 |
| 4,807,567 | A * | 2/1989 | Atchley | 119/477 |
| 5,363,802 | A * | 11/1994 | Huff | 119/475 |
| 5,549,074 | A * | 8/1996 | Hui | 119/477 |
| 6,561,129 | B1 * | 5/2003 | Cheng | 119/72.5 |
| 2003/0131798 | A1 * | 7/2003 | Gustin | 119/72 |
| 2004/0118355 | A1 * | 6/2004 | Huang | 119/72.5 |

* cited by examiner

*Primary Examiner* — Son T Nguyen
*Assistant Examiner* — Shadi Baniani
(74) *Attorney, Agent, or Firm* — Young & Thompson

(57) ABSTRACT

An animal feeder 10 comprises a container 11 into which liquid feed for a young animal can be placed. A mounting arrangement 12 coupled to the container is of a construction which, in use, enables the container 11 to be attached to an element of a structure such as a rail of a fence. At the lowermost part of the container 11 is a teat mounting 13 which has at least first and second teat mountings 19 and 20. The first teat mounting 19 has a different orientation relative to the container 11 to that of the second teat mounting 20. As a result an end user of the feeder can select one of the teat mountings 19 and 20 for the mounting of a teat P depending on whether the end user wants the teat P to project away from or through the fence on which the container is mounted. A bung or blanking plug 24 is used to seal the other teat mounting.

6 Claims, 2 Drawing Sheets

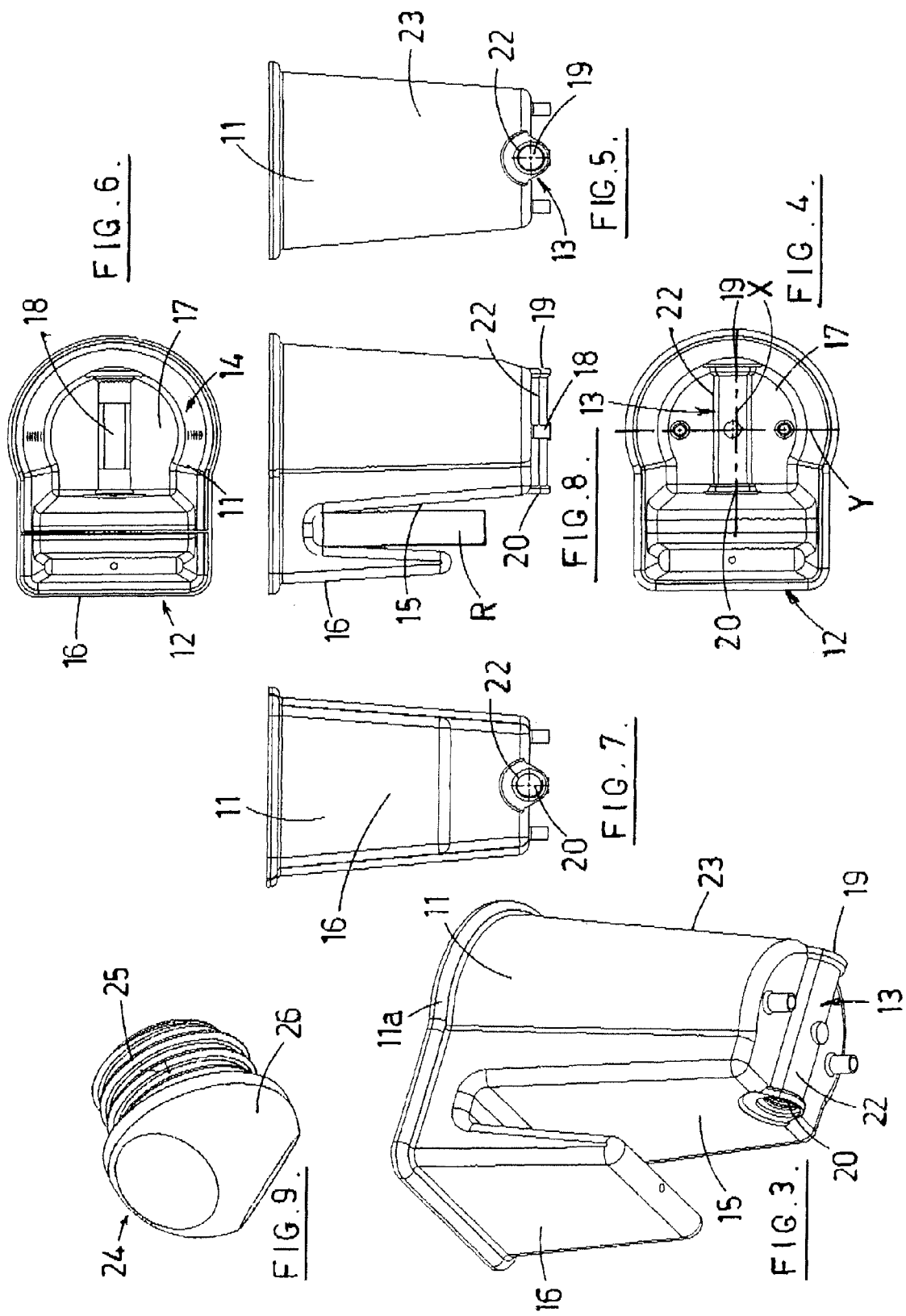

FEEDER

CLAIM OF PRIORITY

This application is a continuation-in-part of U.S. Design Application Ser. No. 29/352,071, filed on Dec. 15, 2009, which claims priority to New Zealand Design Application Ser. No. 412402, filed Jun. 16, 2009, each of which is incorporated by reference in its entirety.

BACKGROUND OF THE INVENTION

This invention relates to an animal feeder and more particularly a feeder for the feeding liquid feed to small animals such as calves.

Various types of feeder devices are known for the feeding of liquid feed to young animals such as calves. One such device is a bottle with a teat. The bottle is intended to be hand held in a position such that the animal can suckle the teat.

Another type of animal feeder is a mobile feeder which has a tank or container mounted on a mobile frame or chassis. The container is connected to a plurality of teats. For example the teats can be connected direct to the container or to a manifold which is in turn connected to the container. The feeder can thus be transported to the site at which it is to be used e.g. a pasture in which the animals to be fed are located.

Yet another type of animal feeding device is a container which has one or a plurality of teats mounted in a wall of the container adjacent the floor of the container. The feeder device is designed to be mounted on and supported by a structure such as a fence. In use the feeder will be mounted at a height such that an animal can access the teat or one of a series of the teats projecting from the container wall and thereby draw liquid feed from the container.

The mounting arrangement of one known form of feeder of this type can permit the container to be mounted to the structure (e.g. fence) so it is located on the same side of the structure at which the animal(s) are located. Another form of this type of feeder has a mounting arrangement where the container is located at the side of the supporting structure opposite to that at which the animal(s) are located. With this form of feeder the teat(s) project through the structure to thereby be accessible to the feeding animal(s).

Some animal breeders/farmers prefer this latter form of the feeder because the container is not exposed to damage or becoming dislodged by the animal(s) feeding therefrom. Also the container may be considered to be more accessible to filling with the feed.

To make the teat(s) accessible to the feeding animals the orientation of the teats differs from one form of the feeder to the other. Thus with the form of feeder which is located on the same side of the structure to the animal(s) the teat will project directly out from the container in a direction away from the plane of the structure. With the other form of the feeder, however, the teat must be directed through the structure so as to be accessible to the animal. The two types of feeders thus have different constructions.

Suppliers of animal feeders thus need to stock both forms of the feeder to cater for the preferences of theft customers. Also some manufacturers produce both of these forms of feeder to meet market demand. Also some farmers/breeders may have both forms of the feeder in order to deal with different situations arising from restrictions as to how the feeder may be attached to a particular fence or other structure.

SUMMARY OF THE INVENTION

It is an object of the present invention to provide an animal feeder of the type whereby the feeder can be attached to a supporting structure the feeder having a teat mounting arrangement which permits an end user to select a suitable orientation of the teat depending on the orientation of the feeder on the supporting structure.

Broadly in one aspect of the invention there is provided an animal feeder which comprises a container into which liquid feed for an animal can be placed, a mounting coupled to the container the mounting being adapted to, in use, enable the container to be attached to a structure, at least first and second teat mountings coupled to the container, the first teat mounting having a different orientation relative to the container to that of the second teat mounting such that an end user of the feeder can select the first or second teat mounting for the mounting of a teat depending on the orientation of the container when attached to a structure.

Preferably the first teat mounting and the second teat mounting are each formed by an opening. The opening is preferably formed at the end of a bore.

In one preferred form the opening has an internal screw thread.

In another form an external screw thread is formed around the periphery of the opening.

Preferably the bore of the first teat mounting and the bore of the second teat mounting each extend from and are in communication with a collection area in a floor of the container.

In one form the collection area is formed as a well projecting from the floor of the container.

In a preferred form the opening of the first teat mounting is substantially located below the external surface of one wall of the container and the second teat mounting is located substantially below the external surface of a second wall of the container.

Preferably the first and second wall surfaces are located substantially opposite one another.

The invention can also be broadly said to comprise an animal feeder which includes a container into which liquid feed for an animal can be placed, a mounting coupled to the container the mounting being adapted to, in use, enable the container to be attached to a structure, at least first and second teat mountings coupled to the container, the first teat mounting having a different orientation relative to the container to that of the second teat mounting such that an end user of the feeder can select the first or second teat mounting for the mounting of a teat depending on the orientation of the container when attached to a structure, the first teat mounting and second teat mounting are each formed by a first bore and a second bore, the first bore and second bore extend in substantially opposite directions from a collection area in a floor of the container and have at the end distant from the collection area an opening, each of the first bore and the second bore has at its distant end a screw thread by which, in use, a teat can be fitted to a selected one of the first bore or second bore and a blanking plug can be fitted to the other of the first bore or second bore.

Preferably the opening at the distant end of the first teat mounting is substantially located below an external surface of one wall of the container and the opening at the distant end of the second teat mounting is located substantially below an external surface of a second wall of the container and the first and second wall surfaces are located substantially opposite one another.

Preferably the mounting is a hook construction.

BRIEF DESCRIPTION OF THE DRAWINGS

FIG. 3 is a bottom perspective view of the feeder of FIGS. 1 and 2, FIG. 4 is a bottom plan view of the feeder of FIGS. 1, 2, and 3, FIG. 5 is a front elevation view of the feeder of FIGS. 1 to 4, FIG. 6 is a top plan view of the feeder of FIGS. 1 to 5, FIG. 7 is a rear elevation view of the feeder of FIGS. 1 to 6, FIG. 8 is a side elevation view of the feeder of FIGS. 1 to 7, and FIG. 9 is a perspective view of the bung or blanking plug shown as part of the feeder in FIGS. 1 and 2.

DETAILED DESCRIPTION

Figure 1:
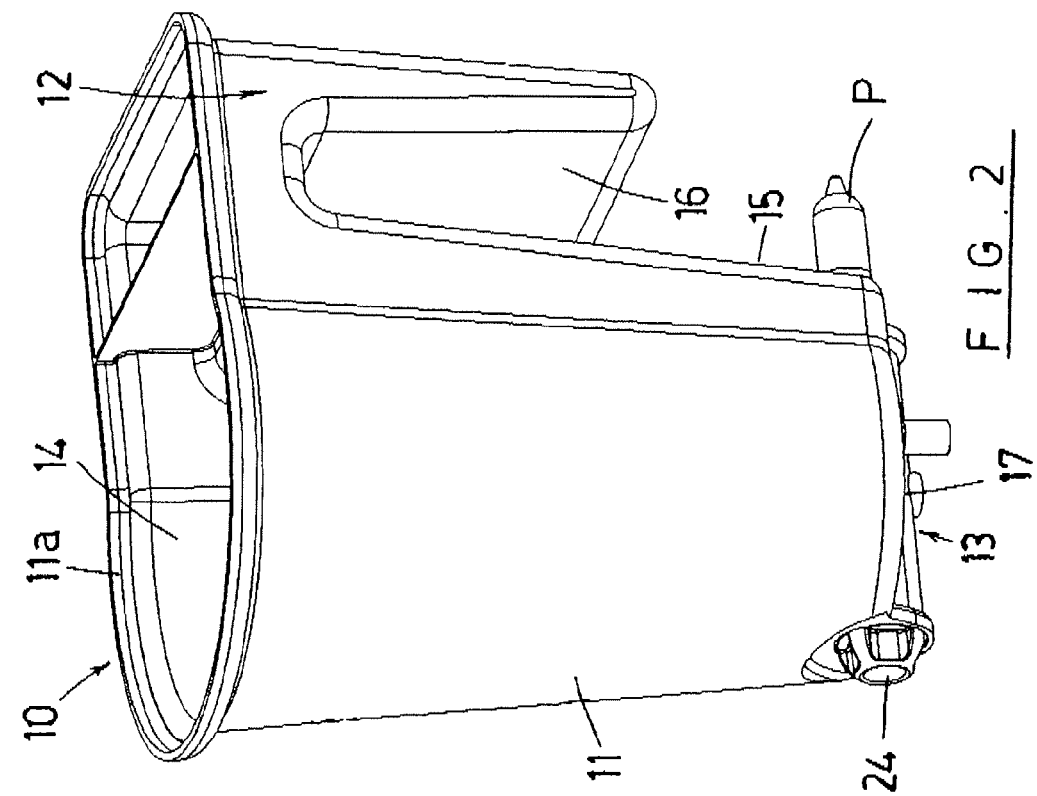
FIG. 1 is a perspective view of an embodiment of an animal feeder incorporating the present invention.

The following describes and illustrates a particular embodiment of the present invention. It will be appreciated by those skilled in the art that other variations and combinations may be possible without departing from the scope of the invention.

For example the embodiment of animal feeder described herein and shown in the drawings is what is described as a single feeder. That is, a feeder which is intended for the feeding of a single animal. In other embodiments the container can be configured to have more teat mountings so that a plurality of teats can be mounted to the container whereby a plurality of animals can feed from the feeder at the same time.

Also the embodiment of the feeder described and shown herein has a mounting arrangement whereby the feeder can be attached to a plank/rail/pipe or other horizontal element of a fence structure. As will be described the mounting arrangement is such that it is simply fitted onto the horizontal element (which will, for ease of reference, be hereinafter referred to as a "rail") without any fixing(s). Other structures and mounting arrangements will, however, be apparent to those skilled in the art.

The main elements of the feeder 10 are a container 11, a mounting arrangement 12 and a teat mounting 13 located at the bottom 17 of the container 10. In the preferred construction the feeder 10 is of a one piece or unit construction molded in one piece from plastics material. Other constructions are possible such as a one piece molded container and teat mounting with a mounting arrangement 12 of metal construction attached to the container.

In the preferred form of the feeder 10 the container 11 has an open top 14. Through this open top 14 can be loaded the liquid animal feed. A cover or lid for the open top could be included. As shown the open top 14 can include a strengthening rim 11a.

The container 11 can be of any size and shape. In the preferred embodiment as illustrated in the drawings the container has a flat wall section 15 from which the mounting arrangement 12 projects. In this embodiment the mounting arrangement 12 is formed by a single hook shape 16 which is molded as one piece with the container 11.

The hook shape 16 is of a shape and configuration such that it can fit over the top of a rail R as can be seen from FIG. 8. In the drawing an angular rail R is shown but the hook shape 16 can equally accommodate a circular section rail such as a pipe or tube. The feeder thus simply hangs in position on the fence at a height such that a feeding animal can suckle on a teat mounted by the teat mounting 13.

The hook shape 16 can be of such a shape and configuration as to apply a gripping force or pressure to the rail R of the supporting structure. This will achieve a more secure hold of the feeder in place on the structure.

The bottom 17 of the container has molded therewith the teat mounting 13. As shown the preferred construction has the teat mounting 13 projecting downwardly below the bottom 17 (the drawings show the feeder 10 in the orientation it will be in when in use). The axis of symmetry X of the teat mounting 13 is preferably substantially at right angles to the plane of wall section 15.

The teat mounting 13 is also substantially symmetrical about axis Y as it provides for mounting of a teat P in opposite directions relative to the plane of wall section 15. Thus an end user can select the direction in which the teat will project from the container relative to the wall section 15.

The teat mounting 13 essentially comprises a collection area for feed and in one form of the invention can be a well 18 which projects downwardly below the floor of the container. The well 18 is connected, and in communication with, first 19 and second 20 openings in which the mounting end of a teat P can be fitted.

In the preferred form of the invention the openings 19 and 20 have internal screw threads. The openings 19 and 20 are preferably at the distant ends (relative to the well 18) of bores 22. The screw threads are of a form into which a threaded mounting of a teat P can engage. Such a threaded teat P is described in New Zealand patent specification No. 504554 (corresponding to U.S. Pat. No. 6,374,773) and is sold internationally under the trade mark PEACH.

Figure 2:
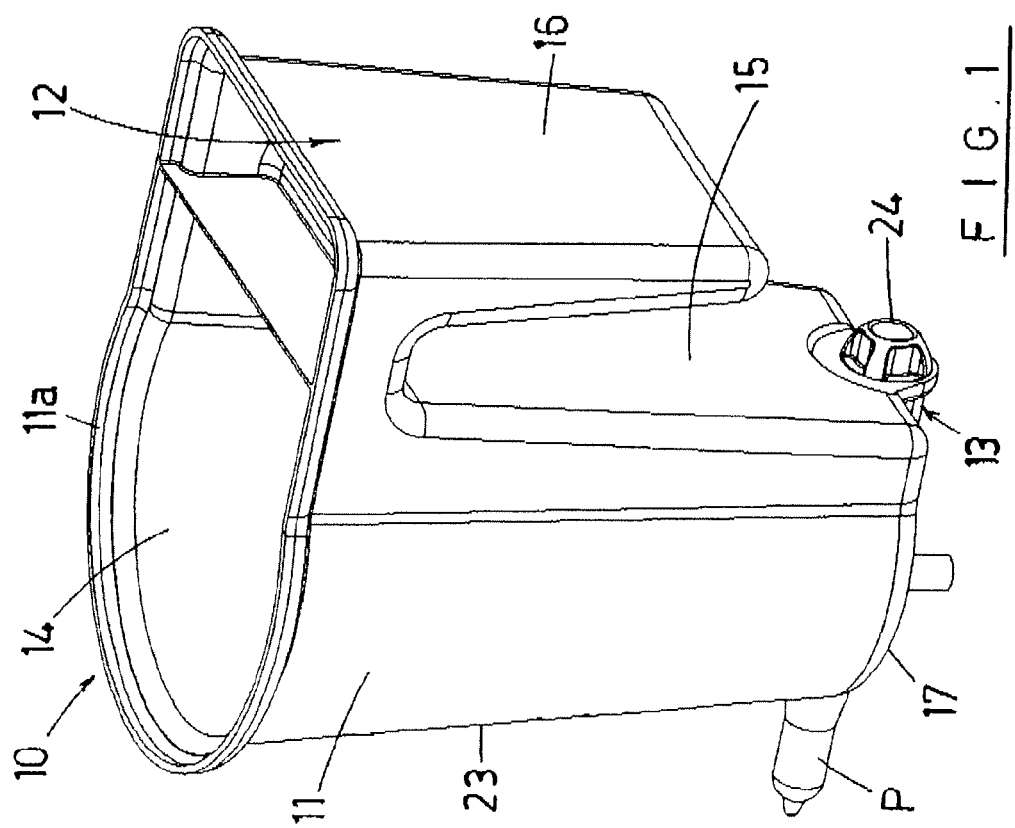
FIG. 2 is a further perspective view of the feeder of FIG. 1.

It will be appreciated to the skilled addressee that different forms of mechanical means for physical attachment of a teat to the teat mounting 13 can be used within the scope of the invention. Simple openings or threaded bores are two examples. As shown the openings or ends of the threaded bores are located at substantially the surface of the front wall 23 and the opposite rear wall section 15. In this way the teat P will project out from the wall 23 (FIG. 1) or the rear wall section 15 (FIG. 2).

In use of the feeder incorporating the invention the user (e.g. farmer) will decide on which side of the fence (i.e. supporting structure such as rail R) the container 11 will be mounted. If the container is to be mounted on the same side of the fence as the animal(s) to be fed is/are located the farmer will install a teat into bore/opening 19 (see FIG. 1). As a result the teat P will project away from the plane of the front wall 23, and hence the fence, to thereby be accessible to the feeding animal.

On the other hand if the container 11 is to be mounted to the fence on the side opposite to that at which the animal(s) is/are located the farmer will install the teat in bore/opening 20 (see FIG. 3). As a result the teat P will project away from the plane of the wall section 15 and hence through the fence to be accessible by the animal.

A bung or blanking plug 24 (FIG. 9) is provided so that the user can insert this into the opening/bore 19 or 20 which does not have a teat P installed therein. 9

FIG. 2 shows the feeder 10 on a fence rail R and located on the side of the fence opposite to that at which the animal to be feed is located. The teat P projects through the fence F to be accessible to the animal. The teat P is installed in bore 20 while the blanking plug/bung 24 is in bore 19.

As illustrated the bung/blanking plug 24 has a screw threaded portion 25 (see FIG. 9) so that it can be simply threaded into the bore 19 or 20 as the case may be. If, however, the feeder is of a construction which simply has openings 19 and 20 for conventional pull through teats then the bung/blanking plug will have a form whereby it can also be pulled through the opening to be installed therein.

The bung/blanking plug 24 has a shaped part 26 which can be gripped by the user to screw in or out the bung/blanking plug 24. The bung/blanking plug is, in a preferred form of the invention, molded in one piece from a suitable plastics material.

In another form of the teat mounting the openings/bores 19 and 20 could have an annular wall thereabout with an external thread onto which a cap with a teat could be screwed. Such a cap and teat arrangement is known in the art and often used with bottle feeders both for small animals and infant children.

Good drainage of the container 11 is achieved by virtue of the collection area 18 projecting out from the floor 17. Also in the preferred form of the invention the bores leading to the openings 19 and 20 are provided with a "fall" to ensure good flow to the teat P. It is envisaged that in normal use of the feeder 10 all liquid feed will be dispensed from the container 11 except for that which is in the bore which has the blanking plug/bung 24. This residual feed can, however, be readily drained or cleaned out during cleaning of the feeder.

The present invention thus enables a single (or multiple teat) feeder to be provided whereby the end user can easily select the configuration of the feeder depending in which side of a supporting structure the feeder is to be mounted relative to the feeding animal(s). As a result the manufacturer only needs to manufacture one form of the feeder which not only significantly reduces tooling and manufacturing costs but also reduces stock holding costs.

Furthermore the stock holding costs of resellers are reduced as the one stock item provides the end user with a versatile feeder. Also an end user who previously needed to buy different feeders because the mounting position of a feeder on one fence could not be used on another fence (due e.g. to physical constraints) will now be able to purchase fewer feeders.

What is claimed is:

1. An animal feeder, comprising:
    a container into which liquid feed for an animal can be placed;
    a mounting coupled to the container, the mounting being adapted to, in use, enable the container to be mounted on a structure; and
    at least first and second teat mountings coupled to the container, each of the teat mountings being adapted to receive a teat,
    wherein the first teat mounting is formed by a first bore and the second teat mounting is formed by a second bore, the first bore and second bore extending in substantially opposite directions from a collection area in a floor of the container, each of the first and second bores having a screw-threaded opening at the end distant from the collection area, and
    further comprising a blanking plug that is screw fitted to the opening of a selected one of the first and second bores and a teat that is screw fitted to the opening of the other of the first and second bores.

2. The feeder of claim 1, wherein each said opening has an internal screw thread.

3. The feeder of claim 2, wherein the collection area is formed as a well projecting from the floor of the container.

4. The feeder of claim 1, wherein the mounting is a hook construction.

5. The feeder of claim 1, wherein the opening of the first teat mounting is substantially located below an external surface of one wall of the container and the opening of the second teat mounting is located substantially below an external surface of a second wall of the container.

6. The feeder of claim 5, wherein the first and second wall external surfaces are located substantially opposite one another.

\* \* \* \* \*